June 13, 1961 M. A. WEISZ 2,988,410
TRAY FOR DASHBOARDS OF AUTOMOTIVE VEHICLES
Filed Jan. 11, 1960
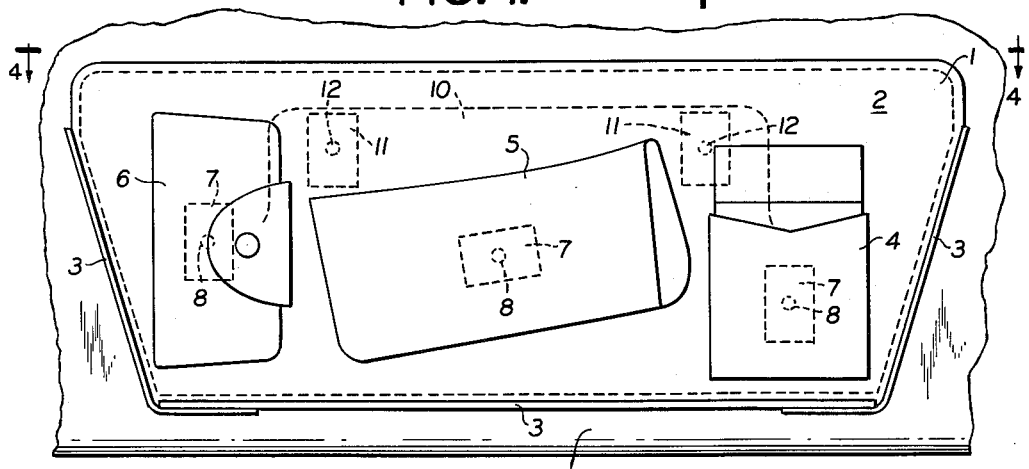
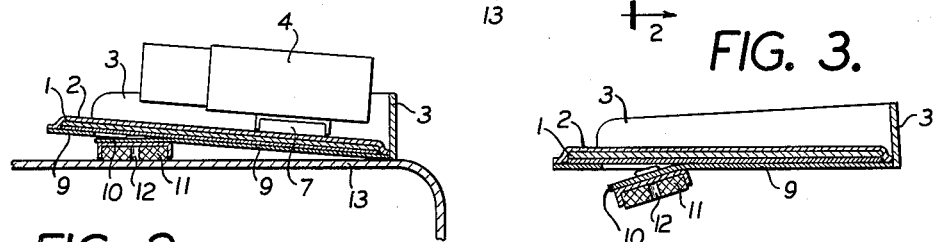
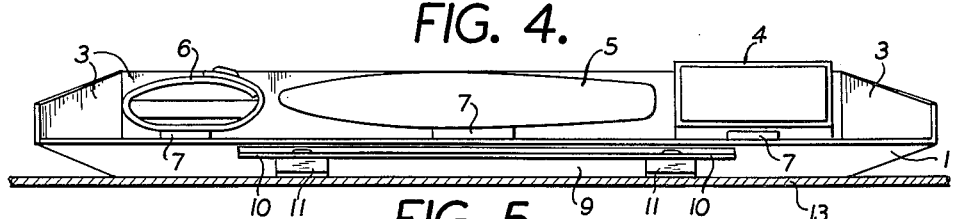
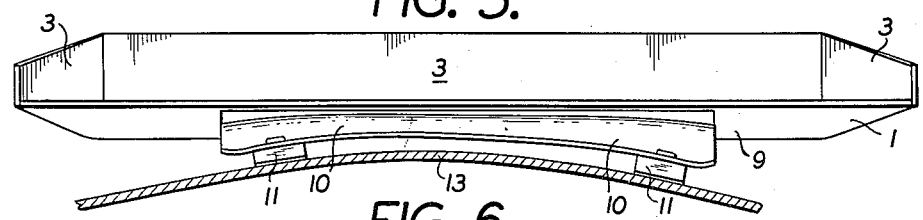
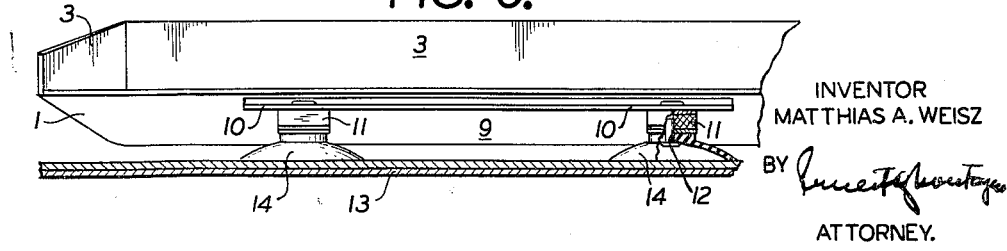
INVENTOR
MATTHIAS A. WEISZ
BY
ATTORNEY.

United States Patent Office 2,988,410
Patented June 13, 1961

2,988,410
TRAY FOR DASHBOARDS OF AUTOMOTIVE VEHICLES
Matthias A. Weisz, 9711 63rd Drive, Forest Hills, N.Y.
Filed Jan. 11, 1960, Ser. No. 1,511
2 Claims. (Cl. 311—21)

The present invention relates to trays for dashboards of automotive vehicles which are known per se and which are adapted to receive different articles on top thereof, as for instance a cigarette box, an eyeglass case, a coin case, or the like.

It has been proposed before to secure different articles, as for instance a cigarette box or the like, to a tray disposed on a dashboard by means of magnets secured to the underface of the box or the other articles. By this arrangement, the articles may be just put on the tray in any selected position and the magnets will retain these articles on a tray, even during movement of the car and are not thrown off the tray if the car is subjected to jolts on bad roads.

Proposals have also been made to secure the tray to the dashboard by providing magnet bodies on the underface of the tray, which magnets secure the tray to the metallic top face of the dashboard. In case the dashboard is disposed substantially in a horizontal plane, there appears no difficulty to secure the tray to the dashboard. In case, however, the dashboard is of an irregular configuration at its top face, difficulty arises to secure properly the tray to the dashboard and to retain the same on the dashboard during movement of the vehicle.

It is, therefore, one object of the present invention to provide a tray which is equipped with means to secure the tray to a dashboard of an automotive vehicle, regardless of the configuration or shape of the dashboard and regardless whether the dashboard is of metal, or has an upholstery which is found in higher priced cars.

It is another object of the present invention to provide a tray for an automotive vehicle, which tray has at its bottom face a sheet of leather, plastic or similar pliable material, and which has a flap of preferably rectangular shape, cut out from the sheet on three sides, while retained integrally with the rest of the sheet on the fourth side. The flap portion of the sheet is then equipped with at least one, but preferably more magnets which secure the flap portion and, thereby, the entire tray to the dashboard, whereby, due to the pliability of the material to which the magnet has been secured, the magnets may assume a position in a plane angularly displaced relative to the bottom face of the tray.

It is yet another object of the present invention to provide a tray, the bottom face of which has a layer or sheet of plastic, leather or other pliable material, which forms a preferably rectangular flap cut out on three sides from said sheet, while the fourth side is integral with the sheet and said flap has one or preferably more magnets secured thereto. The magnets are equipped with a center bore to receive a pin attached to a suction cup, which thus transforms the magnets into means for securing the flap to an upholstered surface, instead of to a metallic surface.

With these and other objects in view which will become apparent in the following detailed description, the present invention will be clearly understood in connection with the accompanying drawing, in which:

FIGURE 1 is a top plan view of the tray to which several articles have been secured;

FIG. 2 is a section along the lines 2—2 of FIG. 1;

FIG. 3 is a section along the lines 2—2 of FIG. 1 through the tray with the securing flap shown spaced apart from the tray and without showing the dashboard;

FIG. 4 is a section along the lines 4—4 of FIG. 1;

FIG. 5 is a section similar to that of FIG. 4, in which, however, the dashboard has a curved upper face instead of a plane top face, the dashboard being made of metal; and FIG. 6 is another section similar to that of FIG. 4, in which suction cups are secured to the magnets.

Referring now to the drawing, and in particular to FIG. 1, the tray designed in accordance with the present invention comprises a metal base 1 which may have on its top face a layer 2 of plastic, leather or the like. Preferably, the metal base has upwardly projecting side walls 3 disposed preferably on three sides of the metal base 1. Different articles such as a cigarette box 4, an eyeglass case 5, and a coin case 6 are secured to the top face of the metal base 1 and its layer 2, respectively.

In order to secure these articles to the metal base 1, each of said articles is equipped with a permanent magnet 7 which is disposed on and secured to the bottom face of said articles 4, 5, and 6, respectively. Each of the magnets 7 has a central bore 8 for a purpose to be described later.

As may be easily ascertained from FIGS. 2 and 3 of the drawing, the metal base 1 has also a bottom layer or sheet 9 of leather, plastic or any other suitable material. A flap 10 is cut out from the bottom sheet 9 and the flap 10 is preferably of rectangular shape and is cut out on three sides thereof, while the fourth side remains integrally with the bottom sheet 9. Two magnets 11 are shown in the example disclosed in FIG. 1 of the drawing and as may be ascertained from FIGS. 4 and 5 of the drawings, regardless whether the top face of the dashboard is disposed in a plane or whether it is of curved shape.

It is well known that there is now a tendency to equip the dashboard with upholstery in order to minimize any injuries in automobile accidents due to the fact that upon a sudden stop the passenger is thrown against the dashboard. If the dashboard has upholstery, it has been found that the magnets would not be operative and would not be suitable for securing the tray to the dashboard.

In order to provide means for securing the tray designed in accordance with the present invention to the dashboard, the magnets are equipped with a central bore 12, which bores are adapted to receive a pin extending from a suction cup 14, which suction cup 14 is arranged to engage the upholstered dashboard 13 and thus secures the tray to the dashboard 13.

As there may be readily seen in FIG. 5, due to the arrangement of the magnets 11 on the flap 10, the magnets may assume an inclined position relative to the tray itself and adjust themselves tangentially to the surface of the dashboard, so that regardless whether the upper face of the dashboard is disposed in a plane or whether it is curved, the flap 10 will permit the attachment of the tray to the dashboard. The same applies also if an upholstered dashboard is used, since then the suction cups are the means for securing the tray to the dashboard and since the magnets, jointly with the suction cups, are again mounted on the flap 10, it is quite clear that again even in the case of a curved surface of the dashboard 13, a safe securing of the tray to the dashboard is brought about.

While I have disclosed several embodiments of the present invention, it is to be understood that these embodiments are given by example only and not in a limiting sense, the scope of the present invention being determined by the objects and the claims.

I claim:
1. A tray for a dashboard of automotive vehicles com- prising a base member having a bottom sheet of pliable material secured and disposed in a plane, said bottom sheet including a flap cut out from said bottom sheet and at least a portion of said flap being integrally connected with said sheet, and at least one magnet rigidly secured to the bottom face of said flap, in order to secure said flap and, thereby, said tray to said dashboard, a suction cup coordinated to each of said magnets, and means for securing said suction cup to said magnet.

2. A tray for a dashboard of automotive vehicles comprising a base member having a bottom sheet of pliable material secured and disposed in a plane, said bottom sheet including a flap cut out from said bottom sheet and at least a portion of said flap being integrally connected with said sheet, and at least one magnet rigidly secured to the bottom face of said flap, in order to secure said flap and, thereby, said tray to said dashboard, said magnet having a centrally disposed bore, a suction cup having a pin extending axially from the outer face of said suction cup, said pin being received in said bore of said magnet, and said suction cup being adapted to engage the upholstered face of said dashboard.

References Cited in the file of this patent
UNITED STATES PATENTS 2,825,447    Kurland _____ Mar. 4, 1958